United States Patent
Iwano et al.

(10) Patent No.: US 10,658,905 B2
(45) Date of Patent: May 19, 2020

(54) ROTATING ELECTRICAL MACHINE, COMPRESSOR SYSTEM, AND PUMP SYSTEM

(71) Applicant: Hitachi Industrial Products, Ltd., Chiyoda-ku, Tokyo (JP)

(72) Inventors: Ryuuichirou Iwano, Tokyo (JP); Masanori Sawahata, Tokyo (JP); Akeshi Takahashi, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 16/124,373

(22) Filed: Sep. 7, 2018

(65) Prior Publication Data
US 2019/0109514 A1 Apr. 11, 2019

(30) Foreign Application Priority Data
Oct. 10, 2017 (JP) .................................. 2017-196785

(51) Int. Cl.
| | |
|---|---|
| *H02K 9/18* | (2006.01) |
| *F04D 25/08* | (2006.01) |
| *H02K 9/06* | (2006.01) |
| *F04D 29/58* | (2006.01) |
| *F04D 25/06* | (2006.01) |
| *F04D 13/06* | (2006.01) |

(52) U.S. Cl.
CPC ............... *H02K 9/18* (2013.01); *F04D 13/06* (2013.01); *F04D 25/06* (2013.01); *F04D 25/082* (2013.01); *F04D 29/5806* (2013.01); *H02K 9/06* (2013.01); *H02K 2213/03* (2013.01)

(58) Field of Classification Search
CPC .................................. H02K 9/06; H02K 9/18
USPC ....... 310/52, 54, 58, 60 A, 60 R, 61, 62, 63, 310/64
See application file for complete search history.

(56) References Cited

U.S. PATENT DOCUMENTS

| | | | |
|---|---|---|---|
| 2004/0070291 A1* | 4/2004 | Chan ....................... | F28D 1/047 310/64 |
| 2004/0084974 A1* | 5/2004 | Nelson ..................... | H02K 9/04 310/58 |
| 2010/0237727 A1* | 9/2010 | Mantere ................... | H02K 9/10 310/64 |

(Continued)

FOREIGN PATENT DOCUMENTS

JP         10-174369 A      6/1998

*Primary Examiner* — Hanh N Nguyen
(74) *Attorney, Agent, or Firm* — Crowell & Moring LLP (57) ABSTRACT

A rotating electrical machine includes a rotating electrical machine body including a stator, a rotor, a fan configured to circulate a coolant for cooling the stator and the rotor, and a casing containing the stator, the rotor and the fan; and a cooler connected to the rotating electrical machine body. The coolant flows from the machine body into the cooler. The cooler cools the coolant. The coolant flows out of the cooler into the machine body. The cooler has a flow resistance Ra satisfying a relation $0.15 < (Ra/Rm) < (P_0/P_1)$, wherein Ra is a flow resistance of the coolant in the cooler, Rm is a flow resistance of the coolant in the rotating electrical machine body, $P_0$ is a shutoff pressure of the fan, and $P_1$ is a pressure at an operating point of the fan when the flow resistance Ra of the cooler is assumed to be zero.

6 Claims, 3 Drawing Sheets

(56) References Cited

U.S. PATENT DOCUMENTS

2012/0212082 A1* 8/2012 Himmelmann ........ H02K 11/33
310/54

* cited by examiner

FLOW DIRECTION
OF COOLANT

ROTATING ELECTRICAL MACHINE, COMPRESSOR SYSTEM, AND PUMP SYSTEM

CLAIM OF PRIORITY

The present application claims priority from Japanese Patent Application JP 2017-196785 filed on Oct. 10, 2017, the content of which is hereby incorporated by reference into this application.

BACKGROUND OF THE INVENTION

The present invention relates to a rotating electrical machine, a compressor system, and a pump system, more specifically to a rotating electrical machine including a cooler, and a compressor system and a pump system each including the rotating electrical machine.

In general, a rotating electrical machine, such as an electric motor, needs to cool a rotor and a stator, and therefore includes a cooler to cool them. A typical cooler for a rotating electrical machine cools a rotor and a stator by allowing a coolant to flow into the interior of the rotating electrical machine.

In a rotating electrical machine with a relatively large capacity including such a cooler, a coolant flows from the outside toward the inside of the rotating electrical machine into a gap (airgap) between a rotor and a stator along the axial direction, and then the coolant flows radially outward through plural ventilation ducts. In this manner, the coolant cools the interior of the rotating electrical machine. The ventilation ducts are provided in the stator at predetermined intervals in the axial direction and extend in a radial direction.

In some cases, some of the coolant flows into a flow passage provided in the rotor and extending in the axial direction, and then flows radially outward through plural ventilation ducts, thereby cooling the interior of the rotating electrical machine. The ventilation ducts of the rotor are provided at predetermined intervals in the axial direction and extend in a radial direction, as with the ventilation ducts of the stator. In some cases, the coolant that has flowed through the ventilation ducts of the rotor joins with the coolant flowing in the airgap.

The coolant that has passed through the ventilation ducts of the stator is introduced into the cooler, where heat is removed from the coolant. Thereafter, the coolant is again fed inwardly in the axial direction of the rotating electrical machine by internal fans installed at both ends of a rotating shaft of the rotor.

Air is frequently used for a coolant (primary coolant) which cools the interior of the rotating electrical machine. Air or water is frequently used for a coolant (secondary coolant) which exchange heat with the primary coolant in the cooler. The following description illustrates a case where air is used for both a primary coolant and a secondary coolant. The primary coolant and the secondary coolant will hereinafter be referred to as "internal air" and "external air", respectively.

A typical conventional rotating electrical machine includes a stator, a rotor disposed radially inside the stator, a casing that contains the stator and the rotor, and a cooler disposed above the casing for removing heat from internal air that has cooled the stator and the rotor. A tube bundle including plural tubes through which external air flows is provided in the interior of the cooler. When the internal air passes through between the tubes of the tube bundle in the cooler, the internal air exchanges heat with the external air via the walls of the tubes, whereby the internal air is cooled.

Such a conventional rotating electrical machine is disclosed, for example, in JP 10-174369 A.

A cooler is conventionally designed based on specifications of flow-cooling parameters such as amount of heat to be removed, difference in temperatures between a coolant inlet and a coolant outlet, designed air volume, pressure loss, etc. The cooling performance for a rotating electrical machine depends on such cooler specifications. With regard to the pressure loss of the parameters, it is necessary to reduce the pressure loss of the cooler by reducing the flow resistance as much as possible to enhance the cooling performance of a cooler by increasing the flow volume of internal air. It is generally necessary to increase the flow cross-sectional area in order to reduce the pressure loss.

In the case of the above-described cooler, in order to reduce the pressure loss by increasing the flow cross-sectional area, it is required to increase the pitch of the tubes of the tube bundle. However, though the increase in the pitch of the tubes can enhance the cooling performance for the rotating electrical machine, the size of the cooler necessarily increases.

SUMMARY OF THE INVENTION

The present invention has been made in view of the above situation. An object of the present invention is to provide a rotating electrical machine including a cooler which is downsized without reducing the cooling performance for the rotating electrical machine, and to provide a compressor system and a pump system each including the rotating electrical machine.

A rotating electrical machine of the present invention comprises a rotating electrical machine body including a stator, a rotor, a fan configured to circulate a coolant for cooling the stator and the rotor, and a casing containing the stator, the rotor and the fan; and a cooler connected to the rotating electrical machine body, the cooler allowing the coolant to flow from the rotating electrical machine body into the cooler, the cooler cooling the coolant, and the cooler allowing the coolant to flow out of the cooler into the rotating electrical machine body. The cooler has a flow resistance Ra that satisfies a relation $0.15 < (Ra/Rm) < (P_0/P_1)$, wherein Ra is a flow resistance of the coolant in the cooler, Rm is a flow resistance of the coolant in the rotating electrical machine body, $P_0$ is a shutoff pressure of the fan, and $P_1$ is a pressure at an operating point of the fan when the flow resistance Ra of the cooler is assumed to be zero. In another aspect of the present invention, the cooler has a pressure loss $\Delta Pa$ that satisfies a relation $0.15 < (\Delta Pa/(Pd - \Delta Pa)) < (P_0/P_1)$, wherein Pd is a pressure at an operating point of the fan at a rated air volume of the coolant, $\Delta Pa$ is a pressure loss of the cooler at the rated air volume of the coolant, The present invention provides a rotating electrical machine including a cooler which is downsized without reducing the cooling performance for the rotating electrical machine, and also provides a compressor system and a pump system each including the rotating electrical machine.

DETAILED DESCRIPTION OF THE PREFERRED EMBODIMENTS

A rotating electrical machine according to the present invention includes a cooler for cooling a rotor and a stator and can be used, for example, as a large-capacity, high-voltage rotating electrical machine (e.g. a megawatt-level electric motor). A compressor system and a pump system according to the present invention each include the rotating electrical machine as a motor.

According to the present invention, the cooler can be downsized without reducing the cooling performance for the rotating electrical machine by making the flow resistance of the cooler fall within a certain range. This makes it possible to reduce the size and weight of the rotating electrical machine. Further, the reliability of the rotating electrical machine can be maintained because of no reduction in the cooling performance. Furthermore, the production cost can be reduced because of a decrease in the amount of material necessary for the production of the rotating electrical machine. In addition, large space is not needed for installing the rotating electrical machine.

First, a construction of a rotating electrical machine will be described. The following description illustrates an exemplary case where air is used for both a primary coolant (internal air) and a secondary coolant (external air).

Figure 6:
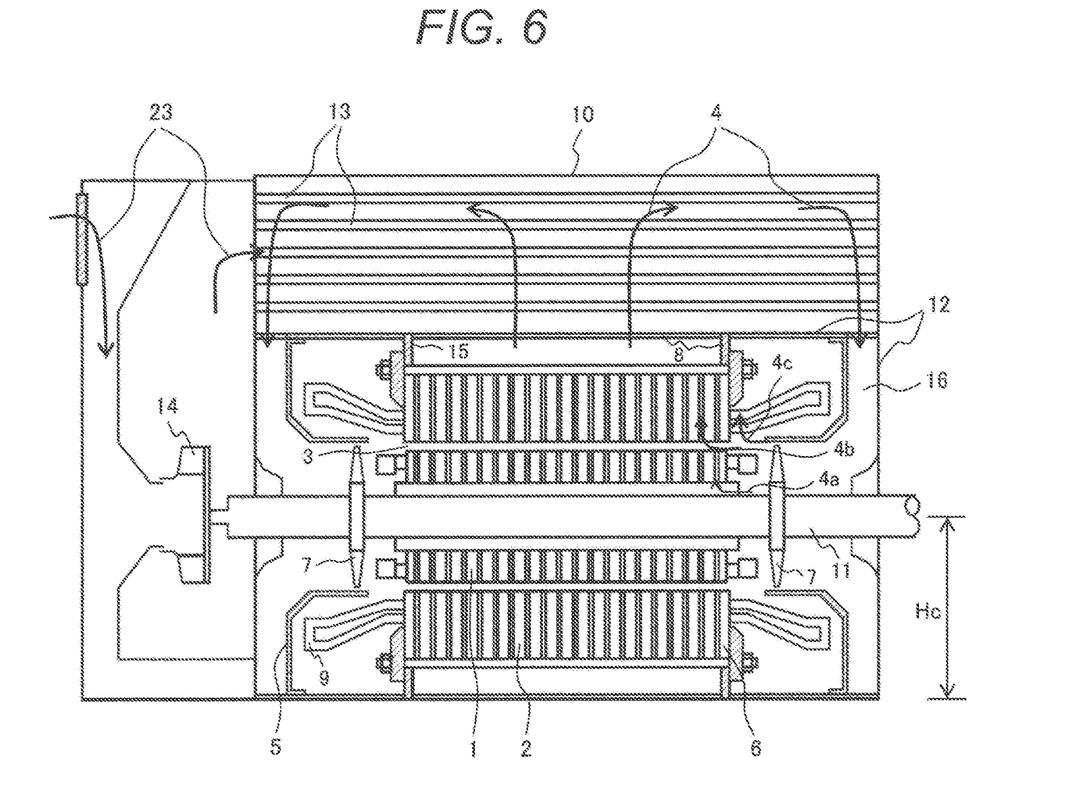
FIG. 6 is a diagram showing a construction of a rotating electrical machine.

FIG. 6 is a diagram showing a construction of a rotating electrical machine. The rotating electrical machine includes a cylindrical stator 2, a rotor 1 having a rotating shaft 11, a stator frame 8 that supports the stator 2, internal fans 7 installed at both ends of the rotating shaft 11, a casing 12 that contains the stator 2, the rotor 1, the stator frame 8 and the internal fans 7, and a cooler 10 disposed above the casing 12. Those portions of the rotating electrical machine other than the cooler 10, i.e. the casing 12 and its interior, are termed a rotating electrical machine body.

The stator 2 includes a stator core 6, and a stator coil (not shown in FIG. 6) contained in slots (not shown in FIG. 6) formed in the inner circumferential surface of the stator core 6. The stator coil has stator coil end portions 9 projecting in the axial direction from the axial ends of the stator core 6. The stator coil end portions 9 are covered with guide plates 5.

The rotor 1 is disposed radially inside the stator 2 with an airgap 3 formed between the rotor 1 and the stator 2.

Part of the stator frame 8 includes main plates 15 each having an opening (not shown in FIG. 6).

The cooler 10 removes heat from internal air 4 that has cooled the stator 2 and the rotor 1.

The internal fans 7 are air blowers and recirculate the internal air 4 whose heat has been removed in the cooler 10 to the interior of the rotating electrical machine body and allow the internal air 4 to flow in the interior. The internal fans 7 may be disposed at positions other than both ends of the rotating shaft 11. Any number of internal fans 7 can be installed at any positions in the casing 12 as long as they can circulate the internal air 4 in the interior of the rotating electrical machine body.

The internal air 4 whose heat has been removed in the cooler 10 is branched by each internal fan 7 into internal air 4a flowing toward the interior of the rotor 1, internal air 4b flowing toward the airgap 3, and internal air 4c flowing toward each stator coil end portion 9. The internal air 4a flowing toward the interior of the rotor 1 cools the rotor 1 and then flows to the airgap 3. The internal air 4b flowing toward the airgap 3 joins with the internal air 4a that has flowed to the air gap 3, and the merged air cools the stator 2 and flows into the stator frame 8. The internal air 4c flowing toward each stator coil end portion 9 cools the stator coil end portion 9, and then flows into the stator frame 8 through the opening (not shown in FIG. 6) of the main plates 15 of the stator frame 8, and joins with the internal airs 4a, 4b.

The internal air 4 into which the internal airs 4a, 4b, 4c have been merged flows out of the periphery of the stator frame 8 and flows into the cooler 10, where heat is removed from the internal air 4. The internal air 4 then flows through flow passages 16 formed by the casing 12 and guide plates 5, and flows into the interior of the rotating electrical machine body by the internal fans 7.

In this manner, the internal air 4 circulates in the interior of the rotating electrical machine body and in the interior of the cooler 10, and cools the stator 2 and the rotor 1. The rotating electrical machine shown in FIG. 6 is a totally-enclosed type rotating electrical machine in which the internal air 4 as a coolant flows in the interior of the rotating electrical machine.

The cooler 10 has in its interior a tube bundle 13 including plural tubes and cools the internal air 4. External air 23 flows in the tubes of the tube bundle 13 by an external fan 14. The external fan 14 is an air blower. When the internal air 4 passes through between the tubes of the tube bundle 13 in the cooler 10, the internal air 4 exchanges heat with the external air 23 in the tubes via the walls of the tubes, whereby the internal air 4 is cooled. The cooler 10 may be installed at positions other than a position above the casing 12. As long as the internal air 4 is allowed to flow from the rotating electrical machine body into the cooler 10 and flow out of the cooler 10 into the rotating electrical machine body, the cooler 10 can be installed at any position where the cooler 10 can connect with the rotating electrical machine body.

In general, a reduction in the size of the cooler 10 increases the pressure loss of the rotating electrical machine (especially, the flow resistance of the cooler 10), resulting in a reduction in the cooling performance for the rotating electrical machine. The present inventors have found a particular range of the flow resistance (pressure loss) of the cooler 10 which, even when the size of the cooler 10 is reduced, can avoid an increase in the pressure loss (flow resistance) of the rotating electrical machine and an attendant degradation in the cooling performance for the rotating electrical machine.

A rotating electrical machine, a compressor system and a pump system according to embodiments of the present invention will now be described.

First Embodiment

In a rotating electrical machine according to a first embodiment of the present invention, the flow resistance Ra of the cooler 10 has a value in the range which satisfies Equation (1):

$$0.15 < Ra/Rm < P_0/P_1 \quad (1).$$

In Equation (1), Ra is the flow resistance of internal air 4 in the cooler 10, and Rm is the flow resistance of internal air 4 in the rotating electrical machine body. $P_0$ is the shutoff pressure of the internal fan 7, and $P_1$ is the pressure at an operating point of the internal fan 7 determined when only the flow resistance Rm of the rotating electrical machine body is taken into consideration, i.e. when the flow resistance Ra of the cooler 10 is assumed to be zero. The way how Equation (1) is obtained will now be described.

Figure 1:
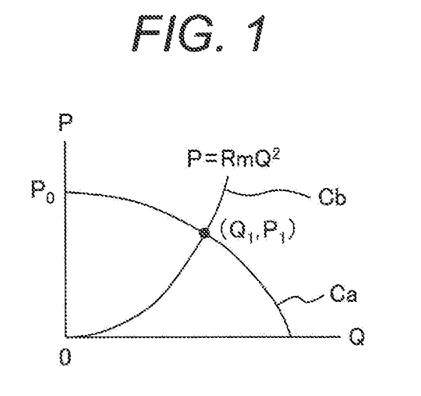
FIG. 1 is a diagram showing a curve Ca which shows a relationship between the air flow volume Q and the pressure P of an internal fan and a curve Cb which shows the flow resistance Rm of a rotating electrical machine body.

FIG. 1 is a diagram showing a curve Ca which shows a relationship between the air flow volume Q and the pressure (static pressure) P of the internal fan 7, i.e. the air flow volume and pressure characteristic of the internal fan 7, and a curve Cb which shows the flow resistance Rm of the rotating electrical machine body. The shutoff pressure $P_0$ of the internal fan 7 is the pressure P in the curve Ca when the air flow volume Q is zero. The intersection $(Q_1, P_1)$ of the curve Ca and the curve Cb is the operating point of the internal fan 7 determined when only the flow resistance Rm of the rotating electrical machine body is taken into consideration, i.e. when the flow resistance Ra of the cooler 10 is ignored. The air flow volume and the pressure of the internal fan 7 are $Q_1$ and $P_1$ at the operating point, respectively. The pressure $P_1$ at the operating point of the internal fan 7 is equal to the pressure loss in the flow path during operation of the internal fan 7.

In general, the flow resistance R is defined by Equation (2):

$$R = \frac{\rho \xi}{2A^2} \quad (2)$$

where $\rho$ is the density of a coolant, $\xi$ is a pressure loss coefficient, and A is a flow cross-sectional area.

Figure 2:
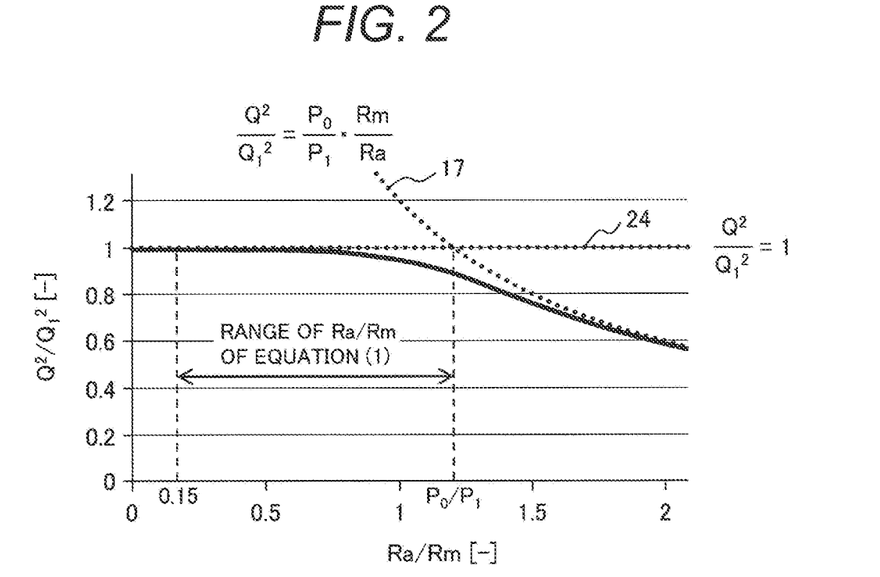
FIG. 2 is a diagram showing the dependency of the air flow volume Q of internal air on the flow resistance Ra of a cooler in a first embodiment of the present invention.
Figure 3:
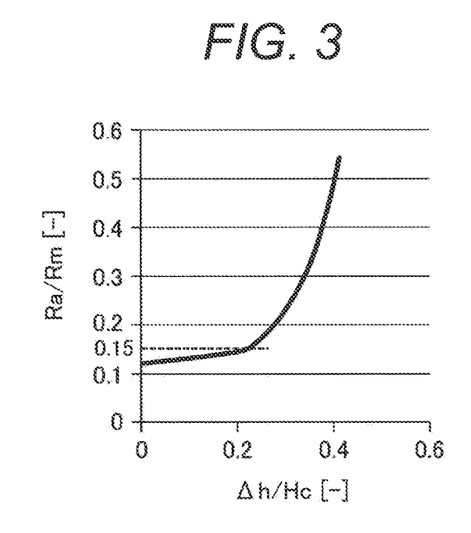
FIG. 3 is a diagram showing a dependency of the flow resistance Ra of the cooler on a reduction Δh in the height of the cooler in the first embodiment of the present invention.

With reference to FIGS. 2 and 3, the reason why the cooler 10 can be downsized without reducing the cooling performance when the flow resistance Ra of the cooler 10 satisfies Equation (1) will now be described.

In general, the relationship between the pressure P (pressure loss in the flow path), the flow resistance R of the flow path, and the air flow volume Q is expressed by Equation (3):

$$P = RQ^2 \quad (3).$$

In the rotating electrical machine according to the first embodiment of the present invention, the flow resistance Ra of the cooler 10 and the flow resistance Rm of the rotating electrical machine body are in series in the flow path, as shown in FIG. 6. Accordingly, in the rotating electrical machine according to the first embodiment, the air flow volume Q of internal air 4 is expressed by Equation (4) using the pressure P of internal air 4:

$$Q^2 = \frac{P}{Rm + Ra}. \quad (4)$$

FIG. 2 is a diagram showing the dependency of the air flow volume Q of internal air 4 on the flow resistance Ra of the cooler 10. In FIG. 2, the flow resistance Ra of the cooler 10 is made dimensionless with the flow resistance Rm of the rotating electrical machine body, and the air flow volume Q of internal air 4 is made dimensionless with the air flow volume $Q_1$ at the operating point of the internal fan 7 which is determined when the flow resistance Ra of the cooler 10 is ignored. The graph in FIG. 2 can be obtained from the relation $P = RmQ^2$ shown in FIG. 1 and Equation (4). The graph in FIG. 2 will now be described.

When the flow resistance Ra of the cooler 10 is sufficiently small relative to the flow resistance Rm of the rotating electrical machine body (Ra<<Rm), the flow resistance Ra of the cooler 10 can be ignored. Accordingly, in Equation (4), it is possible to set Ra=0 and to set the pressure P of the internal fan 7 at the pressure $P_1$ at the operating point. From the relation $Q^2 = P_1/Rm$ thus obtained and the relation $P_1/Rm = Q_1^2$ obtained from FIG. 1, a relation $Q^2 = Q_1^2$ is obtained. Thus, when the flow resistance Ra of the cooler 10 is sufficiently small relative to the flow resistance Rm of the rotating electrical machine body, the square ($Q^2$) of the air flow volume Q of internal air 4 is approximately constant (($Q/Q_1)^2 = 1$). The relation $(Q/Q_1)^2 = 1$ is indicated by the dotted line 24 in FIG. 2.

When the flow resistance Ra of the cooler 10 is very large relative to the flow resistance Rm of the rotating electrical machine body (Ra>>Rm), in Equation (4), it is possible to set Rm=0 and to set the pressure P of the internal fan 7 at the shutoff pressure $P_0$. From the relation $Q^2 = P_0/Ra$ thus obtained and the relation $Q_1^2 = P_1/Rm$ obtained from FIG. 1, a relation $(Q/Q_1)^2 = (P_0/P_1)(Rm/Ra)$ is obtained. Thus, when the flow resistance Ra of the cooler 10 is very large relative to the flow resistance Rm of the rotating electrical machine body, the square ($Q^2$) of the air flow volume Q of internal air 4 is inversely proportional to the flow resistance Ra of the cooler 10 ($Q^2 \propto 1/Ra$). The relation $(Q/Q_1)^2 = (P_0/P_1)(Rm/Ra)$ is indicated by the dotted line 17 in FIG. 2.

Therefore, as shown by the solid line in FIG. 2, the square ($Q^2$) of the air flow volume Q of internal air 4 approaches asymptotically to the dotted line 24 in a region where the flow resistance Ra of the cooler 10 is small relative to the flow resistance Rm of the rotating electrical machine body (Ra/Rm<1), and approaches asymptotically to the dotted line 17 in a region where the flow resistance Ra of the cooler 10 is large relative to the flow resistance Rm of the rotating electrical machine body (Ra/Rm>1).

From the above consideration, the square ($Q^2$) of the air flow volume Q of internal air 4 of the rotating electrical machine is divided into two regions depending on the flow resistance Ra of the cooler 10: a region where the square ($Q^2$) little changes with the value of the flow resistance Ra; and a region where the square ($Q^2$) is inversely proportional to the flow resistance Ra. The boundary of these regions is the intersection of the dotted line 24 and the dotted line 17 shown in FIG. 2 and satisfies Equation (5):

$$\frac{P_0}{P_1} \cdot \frac{Rm}{Ra} = 1. \quad (5)$$

Thus, the boundary of these regions satisfies the relation $Ra/Rm = P_0/P_1$ obtained from Equation (5).

As shown in FIG. 2, when Ra/Rm exceeds the value of $P_0/P_1$, the decrease in the air flow volume Q of internal air 4 is significant, resulting in deterioration of the cooling performance. Therefore, Ra/Rm needs to be smaller than $P_0/P_1$.

On the other hand, from the viewpoint of downsizing the cooler 10, it is not sufficient to simply reduce the flow resistance Ra of the cooler 10. As described above, in order to reduce the flow resistance Ra of the cooler 10, it is necessary to increase the flow cross-sectional area. An increase in the flow cross-sectional area leads to an increase in the size of the cooler 10. Thus, a decrease in the flow resistance Ra of the cooler 10 results in an increase in size of the cooler 10. Therefore, the cooler 10 ought to be downsized at least in a range in which the rate of increase in the flow resistance Ra is small.

The cooler 10 generally has the same width and the same depth as those of the rotating electrical machine body. Therefore, the cooler 10 can be downsized mainly by reducing the height.

FIG. 3 is a diagram showing a dependency of the flow resistance Ra of the cooler 10 on a reduction Δh in the height of the cooler 10. The reduction Δh in the height of the cooler 10 is made dimensionless with the center height Hc of the rotating electrical machine. The flow resistance Ra of the cooler 10 is made dimensionless with the flow resistance Rm of the rotating electrical machine body. As shown in FIG. 6, the center height Hc of the rotating electrical machine is a height from the bottom of the casing 12 to the center of the rotating shaft 11. The curve shown in FIG. 3 is obtained by using the below-described Equation (6) and flow network calculation.

Figure 4:
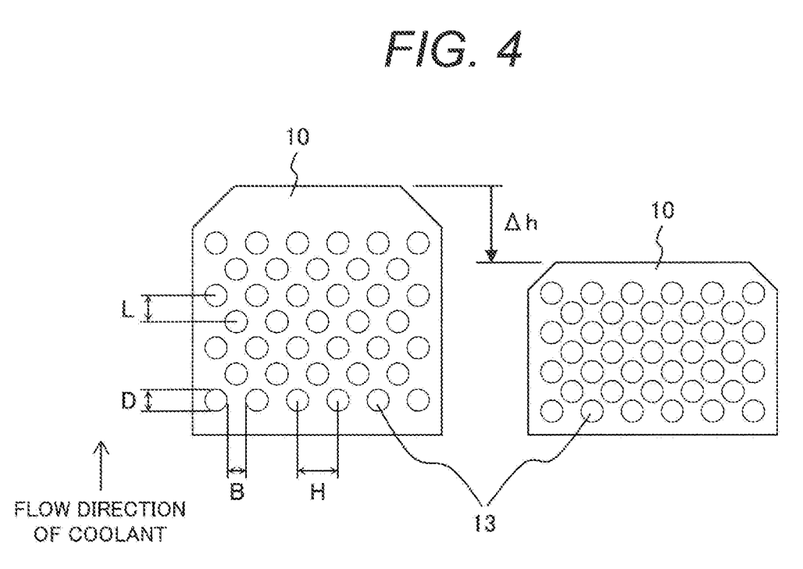
FIG. 4 is a diagram showing cross sections of the coolers perpendicular to the axial direction, illustrating the reduction Δh in the height of the cooler.

FIG. 4 is a diagram showing cross sections of the coolers 10 perpendicular to the axial direction, illustrating the reduction Δh in the height of the cooler 10. Two coolers 10 are shown in FIG. 4, and the right cooler 10 is lower by Δh than the left cooler 10. As described above, the cooler 10 has, in its interior, the tube bundle 13 including plural tubes.

The following empirical formula for a tube bundle is used to evaluate the flow resistance Ra of the cooler 10 in order to examine downsizing (reduction in the height) of the cooler 10:

$$\xi = 0.33 \mathrm{Re}^{-0.15}\left[\left(\frac{H}{D}+1\right)\left(\frac{D}{L}\right)+1.5\left(\frac{L}{B}\right)^{0.75}\right]. \tag{6}$$

In Equation (6), ξ is a pressure loss coefficient, Re is the Reynolds number, H is the center-to-center distance between tubes in the direction perpendicular to the flow direction of the coolant (internal air 4), D is the outer diameter of the tubes, L is the center-to-center distance between tubes in the flow direction of the coolant, and B is the distance between tubes in the direction perpendicular to the flow direction of the coolant (see FIG. 4). The height of the cooler 10 can be reduced by reducing the center-to-center distance L between tubes in the flow direction of the coolant. Thus, the reduction Δh in the height of the cooler 10 can be changed by changing the center-to-center distance L between tubes in the flow direction of the coolant.

Equation (6) is a commonly-known equation. The flow velocity necessary for the calculation of the Reynolds number in Equation (6) is determined by a flow network calculation for the whole of the rotating electrical machine body and the cooler 10. In the flow network calculation, a popularized large-capacity, high-voltage rotating electrical machine (e.g. a megawatt-level high-voltage rotating electrical machine) and a cooler commonly used for such a rotating electrical machine are simulated with a known calculation method.

As shown in FIG. 3, in a region where the reduction Δh in the height of the cooler 10 is small, the rate of increase in the flow resistance Ra of the cooler 10 (the inclination of the curve) is small even with increase in the reduction Δh. This is because the reduction Δh in the height of the cooler 10 is small relative to the flow cross-sectional area of the cooler 10; therefore, a reduction in the height of the cooler 10 has little influence on reduction in the flow cross-sectional area (increase in the flow resistance Ra). On the other hand, in a region where the reduction Δh in the height of the cooler 10 is large, the flow resistance Ra of the cooler 10 increases sharply with increase in the reduction Δh. As can be seen in FIG. 3, the value of Ra/Rm at the start of the sharp increase in the flow resistance Ra of the cooler 10 is 0.15.

Therefore, considering the increase in the flow resistance Ra of the cooler 10, the height of the cooler 10 can be reduced to the extent that the Ra/Rm value does not exceed 0.15. Thus, as can be seen in FIG. 3, the height of the cooler 10 can be reduced at least by the reduction Δh=0.2Hc. The height of the cooler 10 can be further reduced with paying attention to the increase in the flow resistance Ra of the cooler 10 (i.e. with noting the state of Ra/Rm>0.15). Thus, from the viewpoint of downsizing of the cooler 10, the height of the cooler 10 can be reduced in the range of Ra/Rm>0.15 (Δh/Hc>0.2).

From above-described consideration, two limits are derived for the flow resistance Ra of the cooler 10: the lower limit Ra/Rm=0.15 for not unnecessarily increasing the size of the cooler 10; and the upper limit Ra/Rm=$P_0/P_1$ for preventing a reduction in the cooling performance due to decrease in the air flow volume Q of internal air 4.

Equation (1) is obtained from the lower limit 0.15 and the upper limit $P_0/P_1$ for Ra/Rm. The range of Ra/Rm (0.15<(Ra/Rm)<($P_0/P_1$)) specified by Equation (1) is shown in FIG. 2.

The value 0.15 which is the lower limit of Ra/Rm may vary according to the construction of the cooler 10 (e.g. the outer diameter D of the tubes of the tube bundle 13, the center-to-center distances H and L between tubes, the distance B between tubes, etc.). However, the present inventors are of the view that the lower limit of Ra/Rm should preferably be made 0.15 for the cooler 10 commonly used for a popularized large-capacity, high-voltage rotating electrical machine (e.g. a megawatt-level high-voltage rotating electrical machine).

As described hereinabove, if the flow resistance Ra of the cooler 10 satisfies Equation (1), the cooler 10 can be downsized with preventing a reduction in the cooling performance of the cooler 10 due to decrease in the air flow volume Q of internal air 4 caused by an increase in the flow resistance Ra of the cooler 10. In the rotating electrical machine of this embodiment, the flow resistance Ra of the cooler 10 satisfies Equation (1). Therefore, the cooler 10 can be downsized without reducing the cooling performance. An effective method to make the flow resistance Ra of the cooler 10 satisfy Equation (1) is to change the pressure loss of the cooler 10 by changing the size and/or the construction of the cooler 10 (e.g. the outer diameter D of the tubes of the tube bundle 13, the center-to-center distances H and L between tubes, the distance B between tubes, etc.).

It will be a design matter that which value within the range of Equation (1) is to be used for the actual flow resistance Ra of the cooler 10. Even when the flow resistance Ra of the cooler 10 makes the Ra/Rm value exceed 0.15, it does not necessarily lead to a reduction in the cooling performance of the cooler 10. This is because though a reduction in the size of the cooler 10 increases the flow resistance Ra and thereby decreases the air flow volume Q of internal air 4, a reduction in the flow cross-sectional area of the cooler 10 increases the flow velocity of internal air 4, thereby increasing the thermal conductivity. Accordingly, the effect of the decrease in the air flow volume Q of internal air 4 is suppressed. The present inventors have empirically confirmed that a value of the flow resistance Ra of the cooler 10 in a range a little larger than 0.15Rm has a significant effect of increasing in thermal conductivity and can rather enhance the cooling performance of the cooler 10. However, the smaller the cooler 10 becomes (i.e. the larger the Δh value becomes), the larger the rate of increase in the flow resistance Ra is as shown in FIG. 3. Therefore, the adverse effect caused by the decrease in the air flow volume Q increases, reducing the cooling performance. Thus, the optimal value of the flow resistance Ra for the cooling performance of the cooler 10 lies in the range specified by Equation (1).

Second Embodiment

In a rotating electrical machine according to a second embodiment of the present invention, the pressure loss ΔP of the cooler 10 has a value in a range which satisfies Equation (7):

$$0.15 < \Delta Pa/(Pd-\Delta Pa) < P_0/P_1 \tag{7}$$

In Equation (7), Pd is a pressure at an operating point of the internal fan 7 at a rated air volume Qd of internal air 4, and ΔPa is a pressure loss of the cooler 10 at the rated air volume Qd of internal air 4. When the air flow volume and pressure characteristic of the internal fan 7 is known, the pressure Pd of the internal fan 7 can be determined from a design air volume of the internal fan 7. The pressure loss ΔPa of the cooler 10 can be determined by measurement. As described above with reference to the first embodiment, $P_0$ is the shutoff pressure of the internal fan 7, and $P_1$ is the pressure at the operating point of the internal fan 7 determined when only the flow resistance Rm of the rotating electrical machine body is taken into consideration, i.e. when the flow resistance Ra of the cooler 10 is assumed to be zero.

The way how Equation (7) is obtained will now be described.

From the relation between the pressure P, the flow resistance R, and the air flow volume Q, which is expressed by Equation (3):

$$P = RQ^2 \tag{3},$$

the flow resistance Ra of the cooler 10 is expressed by Equation (8):

$$Ra = \frac{\Delta Pa}{Q_d^2}. \tag{8}$$

The overall flow resistance R of the flow path of internal air 4 is the sum of the flow resistance Ra of the cooler 10 and the flow resistance Rm of the rotating electrical machine body (R=Ra+Rm). The overall flow resistance R is expressed by Equation (9):

$$R = \frac{Pd}{Q_d^2}. \tag{9}$$

From Ra/Rm, Equation (10) is derived using the above relations:

$$\frac{Ra}{Rm} = \frac{\Delta Pa}{Pd - \Delta Pa}. \tag{10}$$

Equation (7) is obtained from Equation (10) and Equation (1).

Equation (7) is equivalent to Equation (1). Equation (7) expresses Equation (1) in terms of the main parameters of the cooler 10 and the rotating electrical machine.

In this embodiment, the construction required for the rotating electrical machine is expressed by Equation (7) using the main parameters of the rotating electrical machine to facilitate the design of the machine. In the rotating electrical machine of this embodiment, the pressure loss ΔPa of the cooler 10 satisfies Equation (7). Therefore, as with the rotating electrical machine of the first embodiment, the cooler 10 can be downsized without reducing the cooling performance. An effective method to make the pressure loss ΔPa of the cooler 10 satisfy Equation (7) is to change the size and/or the construction of the cooler 10 (e.g. the outer diameter D of the tubes of the tube bundle 13, the center-to-center distances H and L between tubes, the distance B between tubes, etc.).

Third Embodiment

Figure 5:
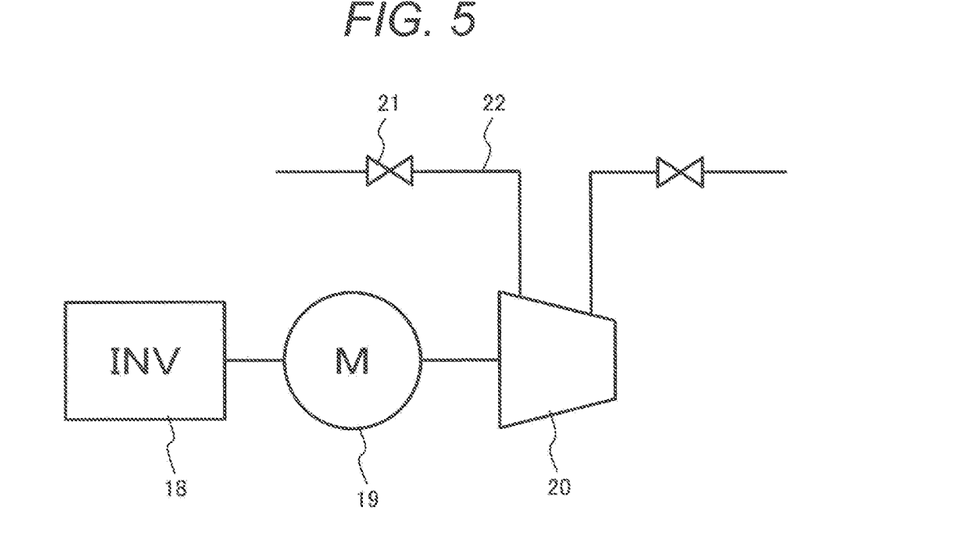
FIG. 5 is a diagram illustrating a compressor system which includes a rotating electrical machine according to a third embodiment of the present invention as a motor.

With reference to FIG. 5, a rotating electrical machine according to a third embodiment of the present invention will now be described. The rotating electrical machine of this embodiment is used as a motor in a pump system or a compressor system. In this embodiment, the rotating electrical machine of the first embodiment or the second embodiment is used as an electric motor in a pump system or a compressor system.

In many cases, a motor used in a pump system or a compressor system needs an installation space with a size equal to or larger than the size of an installation space for a pump or a compressor as a load. Therefore, it is very effective for reducing the installation space of the motor to employ an electric motor including a small-sized cooler 10 as a motor in a pump system or a compressor system.

FIG. 5 is a diagram illustrating a compressor system which includes a rotating electrical machine of this embodiment as a motor. The compressor system includes a compressor 20 and an electric motor 19 as a motor for the compressor 20. The electric motor 19 is a rotating electrical machine according to the first or second embodiment, including the downsized cooler 10. The electric motor 19 is driven e.g. by an inverter 18. The compressor 20 is connected to a pipe 22 which is equipped with a valve 21.

Note that while the compressor system is illustrated as an example in FIG. 5, the electric motor 19 can, of course, be employed in a pump system, in which a pump is installed instead of the compressor 20 and driven by the electric motor 19. In this embodiment, the installation space of the electric motor 19 (rotating electrical machine) can be reduced whether it is the compressor 20 or a pump that is driven by the electric motor 19.

According to the construction of this embodiment, the installation space of the electric motor 19 in a pump system or a compressor system can be reduced without reducing the cooling performance for the electric motor 19 (rotating electrical machine). The reliability of the entire system can therefore be maintained.

The present invention is not limited to the foregoing embodiments, and the foregoing embodiments may be variously modified. The foregoing embodiments have been described in detail, for example, in order to facilitate the understanding of the present invention. The present invention is not limited to embodiments including all the above-described elements. Some elements of an embodiment may be replaced by the elements of another embodiment. Further, elements of an embodiment may be added to another embodiment. Furthermore, some elements of each embodiment may be deleted, subjected to the addition of other elements, or replaced by other elements.

LIST OF THE REFERENCE CHARACTERS

1: rotor
2: stator
3: airgap
4: internal air
4a: internal air flowing toward interior of rotor
4b: internal air flowing toward airgap
4c: internal air flowing toward stator coil end portion
5: guide plate
6: stator core
7: internal fan
8: stator frame
9: stator coil end portion
10: cooler
11: rotating shaft
12: casing
13: tube bundle
14: external fan
15: main plate
16: flow passage
17: dotted line indicating relation $(Q/Q_1)^2=(P_0/P_1)(Rm/Ra)$
18: inverter
19: electric motor
20: compressor
21: valve
22: pipe
23: external air
24: dotted line indicating relation $(Q/Q_1)^2=1$
Ra: flow resistance of cooler
Rm: flow resistance of rotating electrical machine body
$P_0$: shutoff pressure of internal fan
$P_1$: pressure at an operating point of internal fan determined when flow resistance Ra of cooler is assumed to be zero
$Q_1$: air flow volume at operating point of internal fan determined when flow resistance Ra of cooler is assumed to be zero
Pd: pressure at operating point of internal fan at rated air volume Qd of internal air
$\Delta Pa$: pressure loss of cooler at rated air volume Qd of internal air

What is claimed is:

1. A rotating electrical machine comprising:
a rotating electrical machine body including a stator, a rotor, a fan configured to circulate a coolant for cooling the stator and the rotor, and a casing containing the stator, the rotor and the fan; and
a cooler connected to the rotating electrical machine body, the cooler allowing the coolant to flow from the rotating electrical machine body into the cooler, the cooler cooling the coolant, and the cooler allowing the coolant to flow out of the cooler into the rotating electrical machine body,
wherein the cooler has a flow resistance Ra that satisfies a relation $0.15<(Ra/Rm)<(P_0/P_1)$,
wherein Ra is a flow resistance of the coolant in the cooler,
wherein Rm is a flow resistance of the coolant in the rotating electrical machine body,
wherein $P_0$ is a shutoff pressure of the fan, and
wherein $P_1$ is a pressure at an operating point of the fan when the flow resistance Ra of the cooler is assumed to be zero.

2. A compressor system comprising:
a compressor; and
a motor for the compressor,
wherein the motor is the rotating electrical machine according to claim 1.

3. A pump system comprising:
a pump; and
a motor for the pump,
wherein the motor is the rotating electrical machine according to claim 1.

4. A rotating electrical machine comprising:
a rotating electrical machine body including a stator, a rotor, a fan configured to circulate a coolant for cooling the stator and the rotor, and a casing containing the stator, the rotor and the fan; and
a cooler connected to the rotating electrical machine body, the cooler allowing the coolant to flow from the rotating electrical machine body into the cooler, the cooler cooling the coolant, and the cooler allowing the coolant to flow out of the cooler into the rotating electrical machine body,
wherein the cooler has a pressure loss $\Delta Pa$ that satisfies a relation $0.15<(\Delta Pa/(Pd-\Delta Pa))<(P_0/P_1)$,
wherein Pd is a pressure at an operating point of the fan at a rated air volume of the coolant,
wherein $\Delta Pa$ is a pressure loss of the cooler at the rated air volume of the coolant,
wherein Ra is a flow resistance of the coolant in the cooler,
wherein $P_0$ is a shutoff pressure of the fan, and
wherein $P_1$ is a pressure at an operating point of the fan when the flow resistance Ra of the cooler is assumed to be zero.

5. A compressor system comprising:
a compressor; and
a motor for the compressor,
wherein the motor is the rotating electrical machine according to claim 4.

6. A pump system comprising:
a pump; and
a motor for the pump,
wherein the motor is the rotating electrical machine according to claim 4.

* * * * *